(12) United States Patent
Hashimoto

(10) Patent No.: US 9,026,764 B2
(45) Date of Patent: May 5, 2015

(54) MEMORY SYSTEM PERFORMING WEAR LEVELING BASED ON DELETION REQUEST

(75) Inventor: Daisuke Hashimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 121 days.

(21) Appl. No.: 13/420,808

(22) Filed: Mar. 15, 2012

(65) Prior Publication Data

US 2012/0246393 A1 Sep. 27, 2012

(30) Foreign Application Priority Data

Mar. 23, 2011 (JP) .................................. 2011-064554

(51) Int. Cl.
*G06F 12/00* (2006.01)
*G06F 12/02* (2006.01)
*G06F 12/10* (2006.01)
*G06F 13/00* (2006.01)

(52) U.S. Cl.
CPC .... *G06F 12/0246* (2013.01); *G06F 2212/7201* (2013.01); *G06F 2212/7205* (2013.01); *G06F 12/023* (2013.01); *G06F 12/10* (2013.01); *G06F 2212/7211* (2013.01)

(58) Field of Classification Search
CPC .............. G06F 12/023; G06F 12/0246; G06F 12/0253; G06F 12/10; G06F 2212/7201; G06F 2212/7205; G06F 2212/7211; G06F 3/0616; G06F 3/0679; G06F 11/1064; G06F 11/1068; G06F 3/0652; G06F 2212/1036; G11C 16/349
USPC .................................. 711/103, 117, 170, 202
See application file for complete search history.

(56) References Cited

U.S. PATENT DOCUMENTS

| | | | | |
|---|---|---|---|---|
| 5,404,485 A | * | 4/1995 | Ban | 711/202 |
| 5,867,641 A | * | 2/1999 | Jenett | 714/6.32 |
| 5,933,368 A | * | 8/1999 | Ma et al. | 365/185.33 |
| 5,956,473 A | * | 9/1999 | Ma et al. | 714/5.1 |

(Continued)

FOREIGN PATENT DOCUMENTS

| | | |
|---|---|---|
| JP | 2005-222550 | 8/2005 |
| JP | 2006-504201 | 2/2006 |

(Continued)

OTHER PUBLICATIONS

Data Set Management', T13/2015-D Revision 5, Working Draft ATA/ATAPI Command Set—2 (ACS-2), Feb. 8, 2011, pp. 98-99.

(Continued)

*Primary Examiner* — Hong Kim
(74) *Attorney, Agent, or Firm* — Oblon, McClelland, Maier & Neustadt, L.L.P.

(57) ABSTRACT

A memory system of a embodiments includes a first storing area having physical blocks and a second storing area recording a logical to physical translation table and an erasure count table keeping data erasure count in physical blocks. The memory system of the embodiments includes a controller which, when a logical address for deletion is notified, obtains data erasure count of a deletion physical block including a deletion area specified by the physical address corresponding to the logical address, and when a physical block having a small erasure count not more than a predetermined rate of the data erasure count exists in the erasure count table, reads out valid data for the memory system in the physical block having a small erasure count onto the second storing area, writes the above data into the deletion area, and invalidates the valid data in the physical block having a small erasure count.

20 Claims, 12 Drawing Sheets

(56) References Cited

U.S. PATENT DOCUMENTS

| | | | |
|---|---|---|---|
| 6,418,506 B1* | 7/2002 | Pashley et al. | 711/103 |
| 6,587,915 B1* | 7/2003 | Kim | 711/103 |
| 6,760,805 B2* | 7/2004 | Lasser | 711/103 |
| 7,089,396 B2* | 8/2006 | Bottemiller et al. | 711/207 |
| 7,120,729 B2 | 10/2006 | Gonzalez et al. | |
| 7,315,917 B2 | 1/2008 | Bennett et al. | |
| 7,516,295 B2 | 4/2009 | In et al. | |
| 8,122,193 B2 | 2/2012 | Song et al. | |
| 8,230,159 B2 | 7/2012 | Stenfort | |
| 2002/0002652 A1* | 1/2002 | Takahashi | 711/103 |
| 2006/0004951 A1* | 1/2006 | Rudelic et al. | 711/103 |
| 2007/0016721 A1* | 1/2007 | Gay | 711/103 |
| 2007/0294469 A1* | 12/2007 | Teruyama | 711/103 |
| 2008/0163029 A1* | 7/2008 | Hirano et al. | 714/764 |
| 2008/0282024 A1* | 11/2008 | Biswas et al. | 711/103 |
| 2010/0017555 A1* | 1/2010 | Chang et al. | 711/103 |
| 2010/0017650 A1* | 1/2010 | Chin et al. | 714/6 |
| 2010/0115186 A1* | 5/2010 | Chang et al. | 711/103 |
| 2010/0125705 A1* | 5/2010 | Mehra et al. | 711/114 |
| 2010/0205354 A1 | 8/2010 | Suzuki | |
| 2010/0217927 A1 | 8/2010 | Song et al. | |
| 2010/0250829 A1 | 9/2010 | Stenfort | |
| 2010/0268865 A1* | 10/2010 | Ramiya Mothilal | 711/103 |
| 2011/0113075 A1* | 5/2011 | Fukushima | 707/813 |
| 2011/0191521 A1* | 8/2011 | Araki et al. | 711/103 |
| 2012/0117309 A1* | 5/2012 | Schuette | 711/103 |
| 2012/0144097 A1 | 6/2012 | Hashimoto | |
| 2012/0221776 A1 | 8/2012 | Yoshihashi et al. | |
| 2012/0246393 A1 | 9/2012 | Hashimoto | |
| 2012/0254514 A1 | 10/2012 | Nishikubo | |
| 2012/0260025 A1 | 10/2012 | Hida et al. | |

FOREIGN PATENT DOCUMENTS

| | | |
|---|---|---|
| JP | 2008-529130 | 7/2008 |
| JP | 2009-237668 | 10/2009 |
| WO | WO 2011/074712 A1 | 6/2011 |

OTHER PUBLICATIONS

"Information technology—ATA/ATAPI Command Set—2 (ACS-2)", ANSI Incits, Revision 6, Feb. 22, 2011, pp. 50, 98-99 and cover page.

"Information technology—SCSI Block Commands—3 (SBC-3)", BSR Incits, Revision 35, Dec. 7, 2012, pp. 162-166 with cover page.

NVM Express, Revision 1.1, Oct. 11, 2012, pp. 1, 114-117.

* cited by examiner

FIG.6

LOGICAL TO PHYSICAL TRANSLATION TABLE $$\begin{bmatrix} \text{LOGICAL ADDRESS} & \text{PHYSICAL ADDRESS} \\ \vdots & \vdots \end{bmatrix}$$

FIG.7

ERASURE COUNT MANAGEMENT TABLE $$\begin{bmatrix} \text{BLOCK ADDRESS} & \text{PHYSICAL ADDRESS} & \text{ERASURE COUNT} \\ \vdots & \vdots & \vdots \end{bmatrix}$$

FREE BLOCK MANAGEMENT TABLE

| BLOCK ADDRESS | ERASURE COUNT |
|---|---|
| ⋮ | ⋮ |

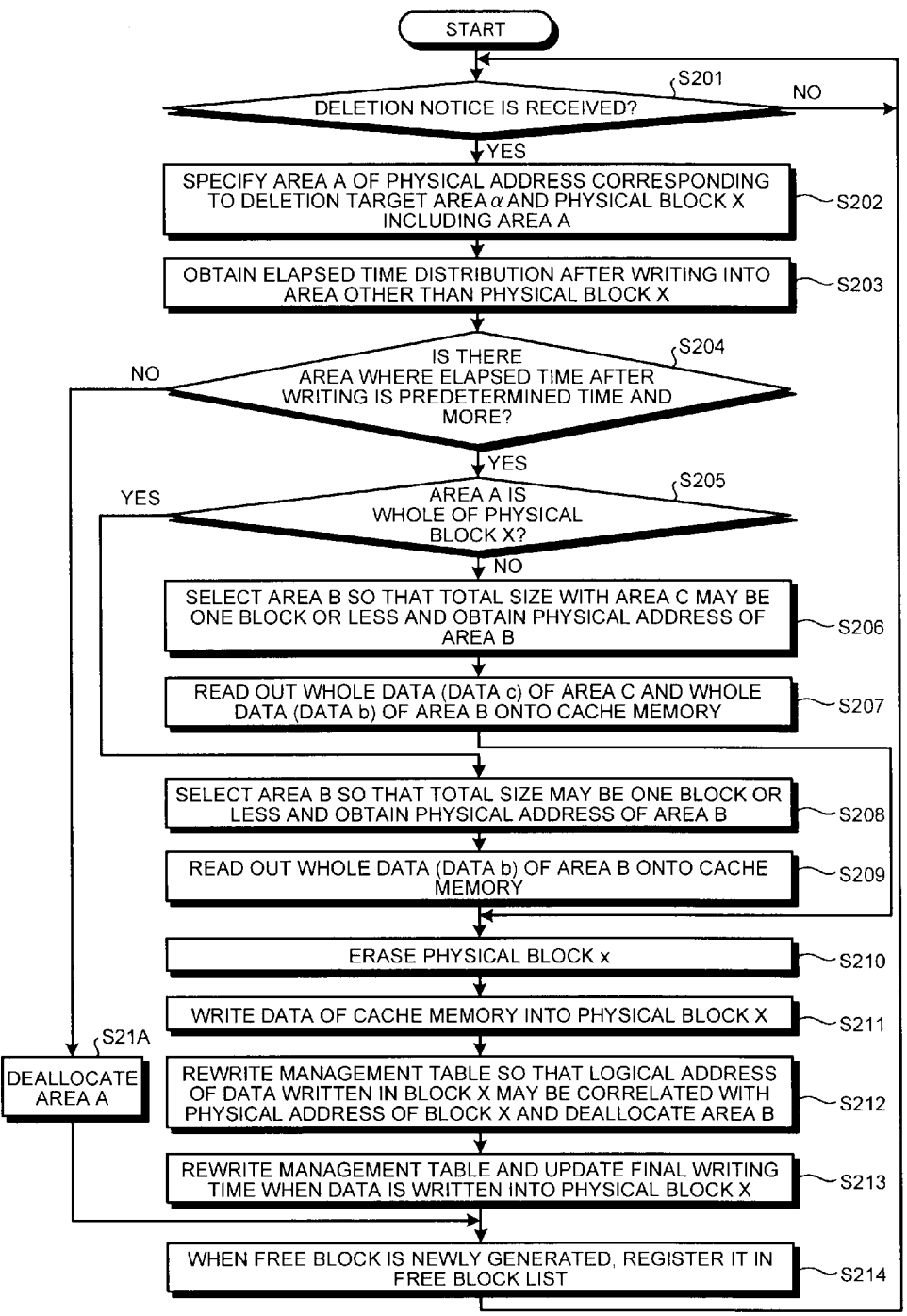

FIG.12

WRITING TIME MANAGEMENT TABLE $$\begin{bmatrix} \text{BLOCK} & \text{PHYSICAL} & \text{ERASURE COUNT} & \text{FINAL WRITING} \\ \text{ADDRESS} & \text{ADDRESS} & & \text{TIME} \\ \vdots & \vdots & \vdots & \vdots \end{bmatrix}$$

FIG.13

LOGICAL TO PHYSICAL TRANSLATION TABLE +
WRITING TIME MANAGEMENT TABLE $$\begin{bmatrix} \text{LOGICAL} & \text{PHYSICAL} & \text{FINAL WRITING} \\ \text{ADDRESS} & \text{ADDRESS} & \text{TIME} \\ \vdots & \vdots & \vdots \end{bmatrix}$$

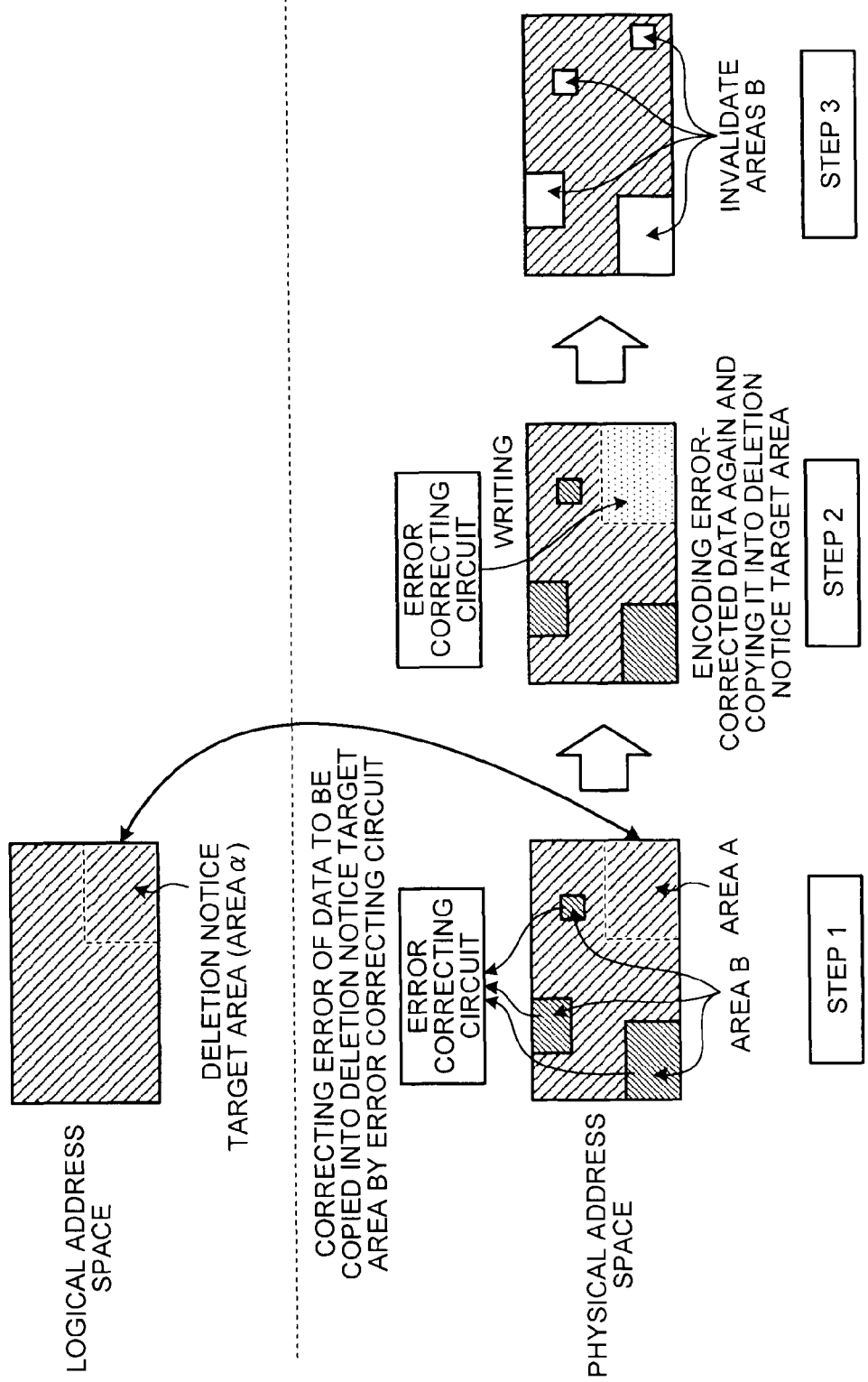

MEMORY SYSTEM PERFORMING WEAR LEVELING BASED ON DELETION REQUEST

CROSS-REFERENCE TO RELATED APPLICATIONS

This application is based upon and claims the benefit of priority from Japanese Patent Application No. 2011-064554, filed on Mar. 23, 2011; the entire contents of which are incorporated herein by reference.

FIELD

Embodiments described herein relate generally to a memory system and a control method of the memory system.

BACKGROUND

When deleting file data on an external storage (for example, a hard disk and a solid state drive (SSD: Solid State Drive)) in an operating system (OS), only the management information (metadata) of the data on the OS is deleted and actually, the data itself is not deleted from the external storage. Since delete processing is not performed on the external storage every time when deleting data on the OS, operational performance is improved for that the deletion processing is not performed on the external storage. This method is effective especially in a hard disk drive whose access speed is slow.

On the other hands, since the deleted data on the OS is recognized as valid data still existing on the external storage (hereinafter, such data is referred to as "host-invalid and device-valid data"), the free area in which data doesn't exist on the external storage is always less than the free area recognized by the OS. Especially, the exhaustion of the free area on the external storage sometimes becomes a big problem when wear leveling is performed in a solid state drive (SSD) in which the logical addresses and the physical addresses of the disk are not in a one-to-one correspondence.

The problems are listed as follows: for example, when data is written into the SSD in a state where host-invalid data of small size is fragmented over the SSD area, load for searching and securing an free area is much imposed on the system, which deteriorates writing performance extremely. Further, when writing is performed under the situation in which there is lots of host-invalid data and free area is exhausted in the memory system, writing access concentrates on a specified area, which degrades reliability of the memory system. These problems can be avoided by issuing a data deletion notice to the memory system when data deletion is performed in the OS.

Invalid data and valid data are defined by the following.
"host-invalid and device-valid data":
   the data invalid for the host and valid for the SSD controller.
"host-valid and device-valid data":
   the data valid for both the host and the SSD controller
"host-valid and device-invalid data":
   the data valid for the host and invalid for the SSD controller
"host-invalid and device-invalid data":
   the data invalid for both the host and the SSD controller
"host-valid data":
   the data valid at least for host.
"host-invalid data":
   the data invalid at least for the host.
"device-valid data":
   the data valid at least for the SSD controller.
"device-invalid data"
   the data invalid at least for the SSD controller.

BRIEF DESCRIPTION OF THE DRAWINGS

FIG. 6 is a view illustrating a logical to physical translation table according to the embodiment;

FIG. 7 is a view illustrating an erasure count management table according to the embodiment;

FIG. 11 is a flow chart illustrating the control method of the memory system according to the embodiment;

FIG. 12 is a view illustrating a writing time management table according to the second embodiment;

FIG. 13 is a view illustrating a table serving both as the logical to physical translation table and the writing time management table according to the second embodiment;

FIG. 16 is a view describing the outline of the concept of the control method of the memory system according to the third embodiment with the logical address space and the corresponding physical address space divided separately.

DETAILED DESCRIPTION

According to one embodiment, a memory system includes a first nonvolatile storing area having plural physical blocks that are units of data erasure and a second storing area capable of recording a logical to physical translation table indicating a correspondence between a logical address specified by a host and a physical address for specifying a position of data on the first storing area and an erasure count management table keeping data erasure count in every physical block having each corresponding logical address in the logical to physical translation table. The memory system of the embodiment includes a memory controller which, when a logical address targeted for deletion is notified by the host, obtains data erasure count of a deletion target physical block including a deletion target data area specified by the physical address corresponding to the logical address, in the logical to physical translation table, and when a physical block having a small erasure count not more than a predetermined rate of the data erasure count exists in the erasure count management table, reads out device-valid data in the physical block having a small erasure count onto the second storing area, writes the above data into the deletion target data area, and invalidates the device-valid data in the physical block having a small erasure count.

Exemplary embodiments of a memory system and a control method of the memory system will be explained below in detail with reference to the accompanying drawings. The present invention is not limited to the following embodiments.

First Embodiment

Figure 1:
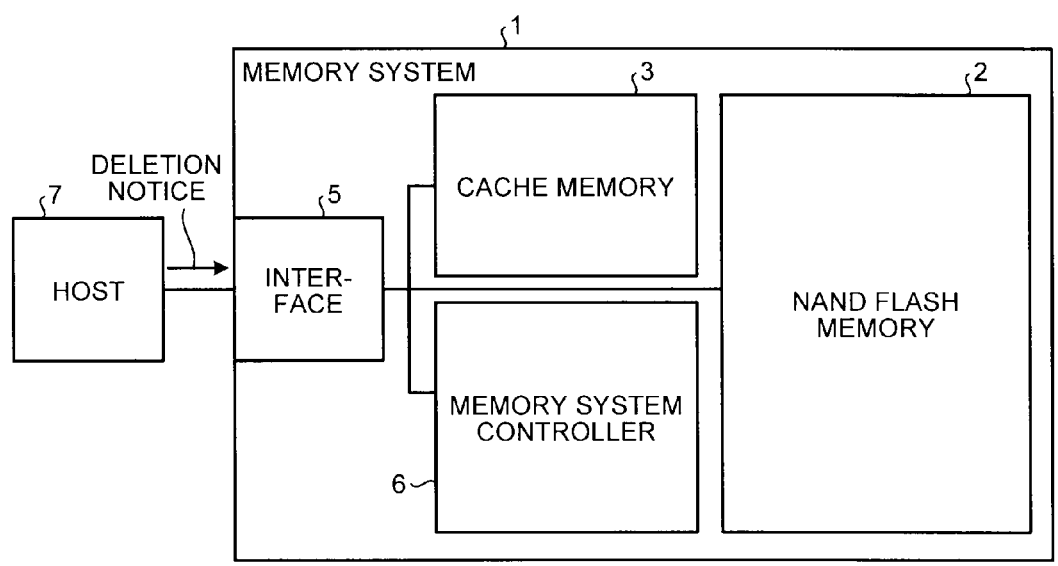
FIG. 1 is a block diagram illustrating a structure of a memory system according to a first embodiment.

FIG. 1 is a block diagram illustrating a structure of a memory system 1 according to a first embodiment. The memory system 1 is, for example, an SSD. As illustrated in the figure, the memory system 1 is connected to a host (Host) 7 such as a personal computer and the like and works as an external storage of the host 7. Here, the host 7 and the memory system 1 are connected with each other through a communication interface compliant with Advanced Technology Attachment (ATA) standard. A writing/reading request and a data deletion notice describe later received by the memory system 1 from the host 7 include a head address of an access area defined by the Logical Block Addressing (LBA) and a sector size indicating the range of the access target area.

The memory system 1 includes a NAND type flash memory (hereinafter, abbreviated as a NAND flash memory) 2 as a nonvolatile semiconductor memory, a cache memory 3 formed by DRAM or SRAM as a volatile semiconductor memory, a memory system controller 6 which controls a data transfer between the host 7 and the NAND flash memory 2 through the cache memory 3 and controls each component within the memory system 1, and an interface 5 that is a host interface controller which controls the communication interface with the host 7. The cache memory 3 may be a cache area within the NAND flash memory 2. The cache memory 3 may be a nonvolatile semiconductor memory such as FeRAM and MRAM. Although the designation of the cache memory is used here, it is not always necessary to install a cache algorithm as far as it is a volatile or nonvolatile memory capable of storing data temporarily.

The data deletion notice issued by the host 7 to the memory system 1 when data deletion is performed on the OS is, for example, Data Set Management Command (referred to as (TRIM) command by the common name) described in INCITS ATA/ATAPI Command Set-2 (ACS-2). This is the method in which by notifying the memory system of the logical address area (LBA area) where the deleted data exists, when data is deleted in the OS, hereinafter, the above area can be treated as the free area on the memory system. When data is deleted on the OS, this method is to notify the external storage of the storing area (LBA area) where the deleted data exists, as LBA Range Entry formed by a combination of LBA and sector size, hence to notify the unnecessary areas for the OS to the storing device from the OS of the host device. As far as it contains the same contents, a command defined by the other standard may be worked as the deletion notice and the notice may be realized by the other commands, for example, such as the SCT Command Transport described in the INCITS ACS-2 and vender's original command.

When the data deletion notice issued by the host 7 is processed (the trim command is executed), the memory system 1 reads out the data management area controlled by the memory system controller 6 to perform the processing for invalidating the corresponding area. In the invalidating processing, the management information of the memory system is rewritten to invalidate the corresponding area as a device-invalid data and it is not necessary to actually delete the data of the above area.

In order to avoid the system from being inoperative due to an excessive bias in the erasure count distribution and the resultant exhaustion on a specified area within the NAND flash memory 2, there is a writing method called Static Wear leveling in which rewriting is performed with the priority given to the areas having the less rewriting counts in the increasing order, to level the erasure count distribution, at each writing request from the host 7. Since the free areas can be secured on the memory system and the choice of the target area for static wear leveling is increased by performing the deletion notice processing, reliability is sometimes improved in the deletion notice method. When a free disk area is small and the erasure count distribution of each free areas is narrow, the effect of the static wear leveling is limited.

On the other hand, with respect to a first NAND flash memory area in which writing is performed frequently and a second NAND flash memory area in which writing is not so often performed, there is a method called Dynamic Wear Leveling in which by copying the data of the first area to the second area and copying the data of the second area to the first area, the wide distribution of erasure counts among the areas are leveled, hence to improve the reliability. Differently from the static wear leveling, the effect of the dynamic wear leveling does not depend on the amount of the empty area. However, since the extra area is rewritten, the lifespan of the memory system may be shorten. Further, since the dynamic wear leveling may be processed during the operation, the performance of the system is possibly deteriorated.

In this embodiment, when the memory system 1 receives a data deletion notice (trim request) from the host 7, it copies the device-valid data of the area having the writing count relatively lower than that of the deletion notice target area to the deletion notice target area and invalidates the data of the above area having the low writing count as a device-invalid data. The device-invalidated data area can be a free block area, which makes it possible to level the wide writing count distribution for every area. In other words, the static wear leveling can be performed more effectively in this embodiment.

Figure 2:
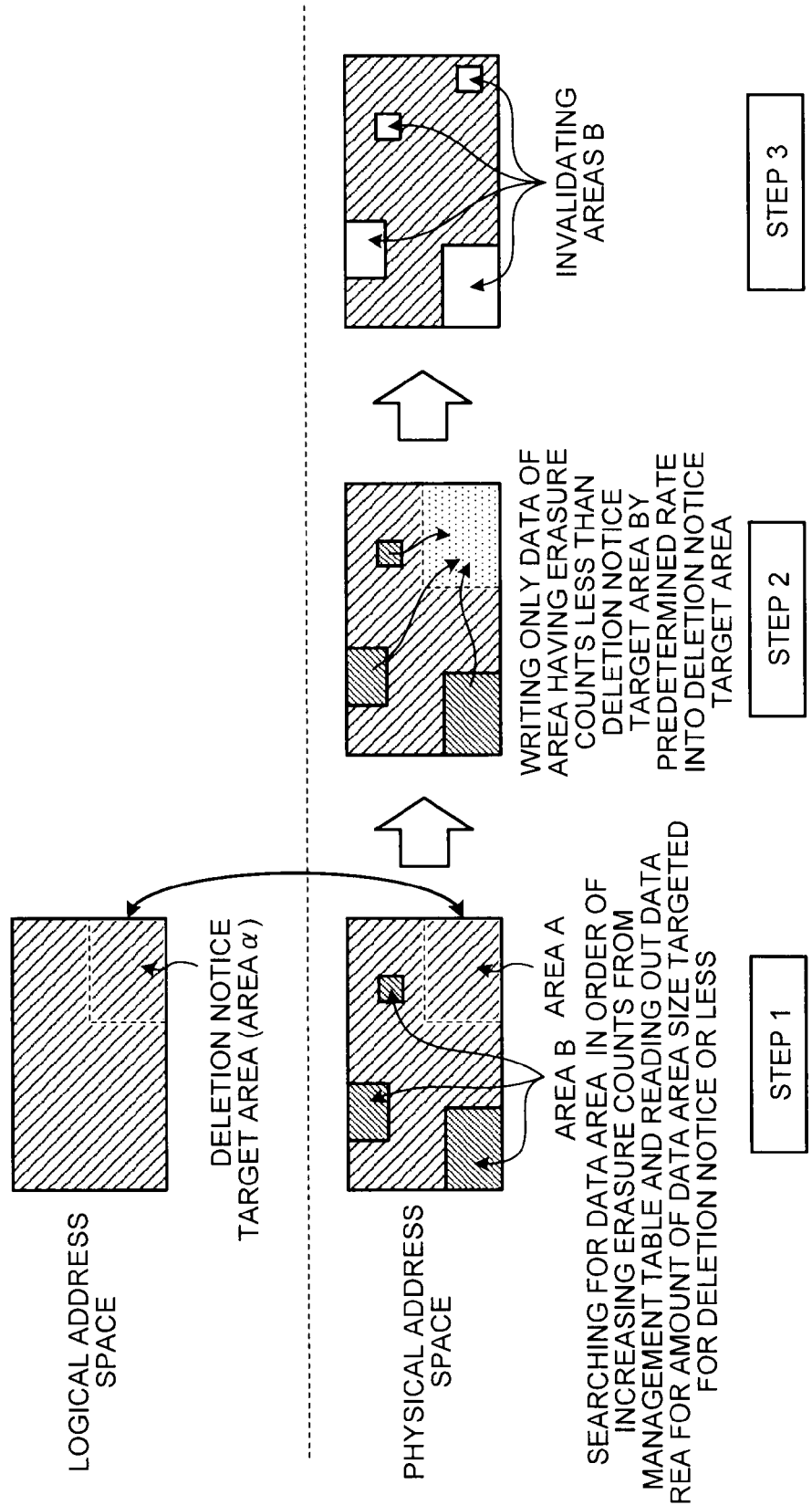
FIG. 2 is a view describing the outline of the concept of a control method of the memory system according to the first embodiment with a logical address space and the corresponding physical address space divided separately.

FIG. 2 is a view describing the outline of the concept of a control method of the memory system according to the embodiment with a logical address area and the corresponding physical address area divided separately. When the system receives the deletion notice about the deletion notice target area (area α) on the logical address area from the host 7, the deletion notice is transmitted to the memory system controller 6 through the interface 5. Upon receipt of the deletion notice, the memory system controller 6 reads out a management table on the cache memory 3 (including a logical to physical translation table and an erasure count management table), specifies a physical area A on the NAND flash memory 2 indicated by the physical address corresponding to the area α and obtains the erasure (rewrite) counts in the past in respective sub-areas included in the area A. The logical to physical translation table (logical address/physical address translation table) is a table indicating a correspondence between the logical address (LBA address) specified by the host 7 and the physical address specifying the area on the NAND flash memory 2. The erasure count management table is a table storing the data erasure count in every physical block having the corresponding logical address in the logical to physical translation table. Alternatively, it may be a table which stores the data erasure count in every physical block on the NAND flash memory 2, regardless of the presence/absence of the corresponding logical address, as the erasure count management table.

The memory system controller 6 obtains the erasure counts of the areas storing device-valid data on the NAND flash memory 2 other than the area A. When there exist some areas B having the erasure count less than a predetermined rate compared with the erasure count of the area A and the total device-valid data size of the areas B is smaller than that of the area A, it obtains the physical addresses of the areas B and reads out the device-valid data of the areas B to the cache memory 3 (FIG. 2 "Step 1"). The above-mentioned predetermined rate may be determined in advance at system design time. When the total device-valid data size of the areas B is larger than that of the area A, areas are selected as the areas B in ascending order of erasure count as long as the total device-valid data size of the areas B is smaller than that of the area A and defines them as the areas B. As illustrated in the figure, the areas B may be fragmented over the NAND flash memory 2. The memory system controller 6 writes the device-valid data read out from the areas B into the area A (FIG. 2 "Step 2"). When the area A have an unwritten area that is not filled by the copy of the data of the areas B, the memory system controller 6 rewrites the management table to set the unwritten area as an additionally writable free area. The memory system 1 invalidates the areas B as a device-invalid area (FIG. 2 "Step 3").

According to the above mentioned operations, the area B becomes the target for the static wear leveling in the next writing process and the later by deallocating the area B having the lower erasure count than the area A that is the deletion notice target area and the rewriting count distribution on the whole memory system is leveled, thereby improving the reliability of the memory system 1.

Figure 3:
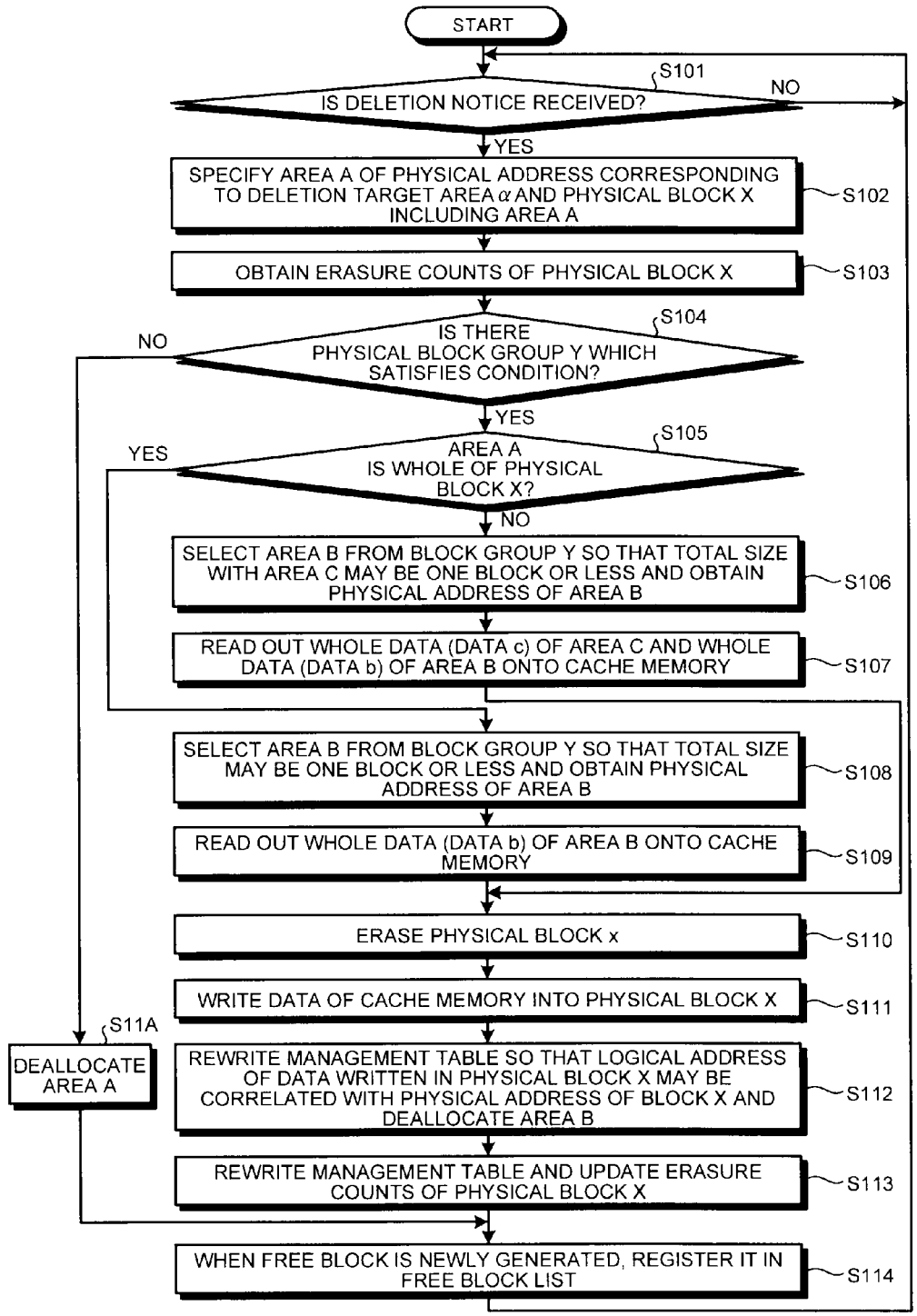
FIG. 3 is a flow chart illustrating the control method of the memory system according to the first embodiment.
Figure 4:
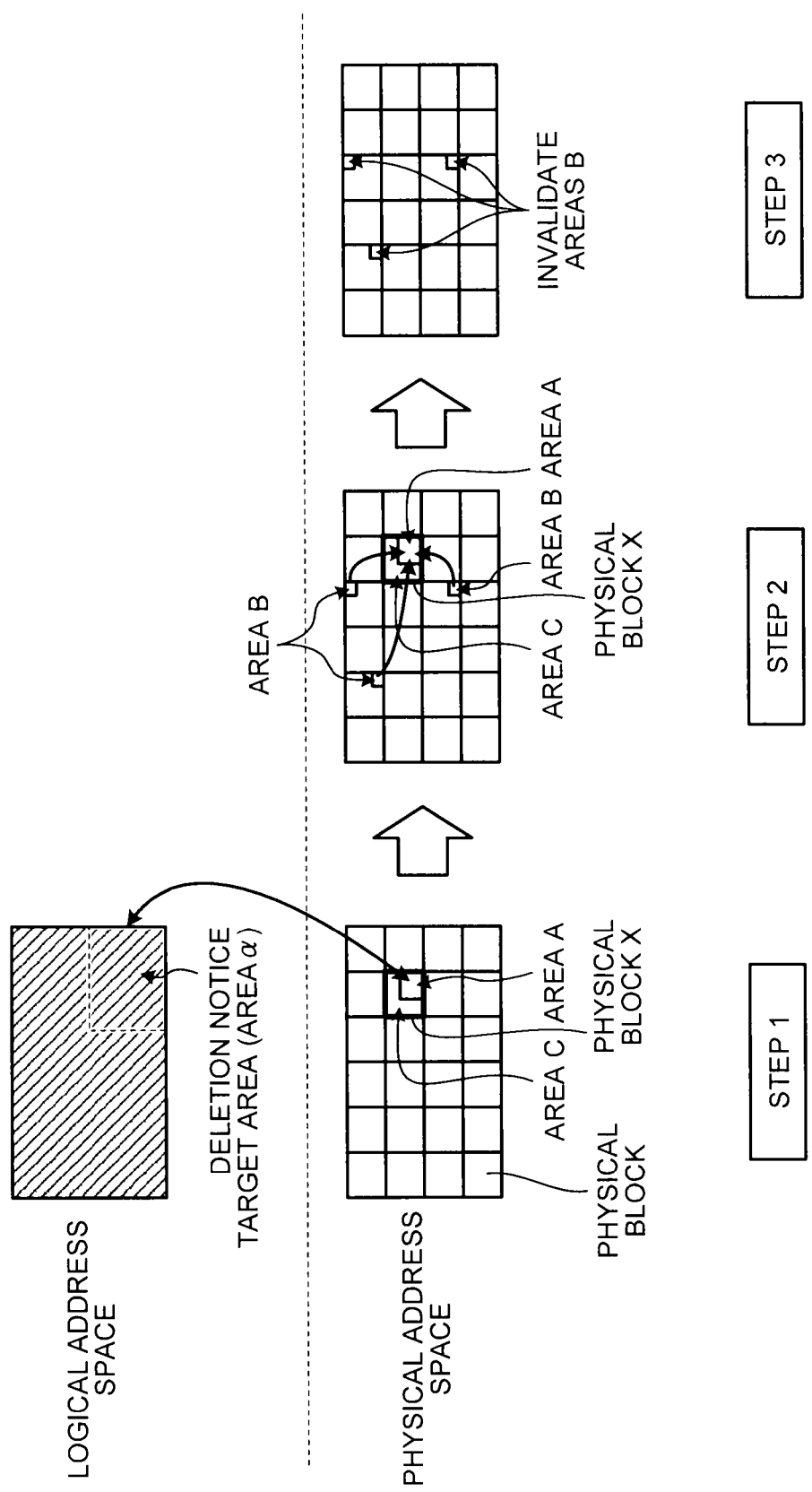
FIG. 4 is a view describing the detail of the concept of the control method of the memory system according to the embodiment with the logical address space and the corresponding physical address space divided separately.
Figure 5:
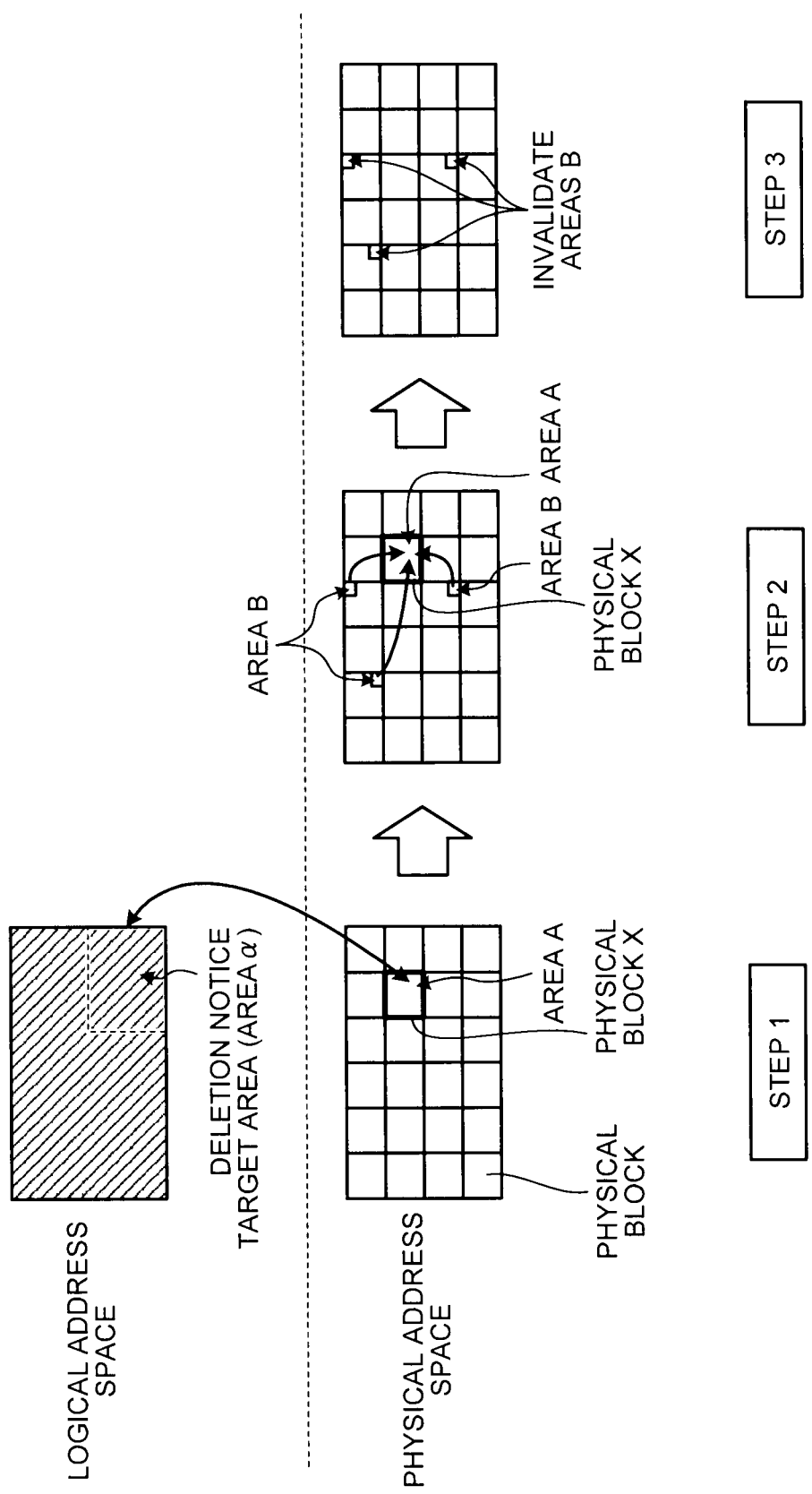
FIG. 5 is another view describing the detail of the concept of the control method of the memory system according to the embodiment with the logical address space and the corresponding physical address space divided separately.

The control method of the memory system 1 according to the above-mentioned embodiment will be described in detail as follows, using the flow chart illustrated in FIG. 3 and the concept views illustrated in FIGS. 4 and 5. FIGS. 4 and 5 are the views more specifically illustrating the concept of the control method of the memory system according to this embodiment, with the logical address space and the corresponding physical address space illustrated separately. According to this, upon receipt of a deletion notice from the host 7, the erasure count distribution in each area of the memory system 1 can be leveled.

Upon receipt of the deletion notice for the logical address area α that is the deletion notice target, from the host 7 (Step S101: Yes), the memory system controller 6 reads out the management table. For example, the management table is stored on the cache memory 3 of FIG. 1. The management table includes the logical to physical translation table, as illustrated in FIG. 6, indicating a correspondence between the logical addresses and the physical addresses for specifying the position of the data on the NAND flash memory 2. The memory system controller 6 specifies the area A on the NAND flash memory 2 of the physical address corresponding to the logical address area α and the memory system controller 6 specifies a NAND physical block group (group P) including the data of the area A, using the logical to physical translation table illustrated in FIG. 6 (Step S102) (FIG. 4 "Step 1" or FIG. 5 "Step 1"). The NAND physical block is the unit of data erasure and the group P specified in Step S102 includes one or a plurality of physical blocks. Hereinafter, to make the description simple, the following description will be made assuming that the data of the area A is included in one NAND physical block X as indicated in "Step 1" of FIGS. 4 and 5.

As described below, the processing is different between FIG. 4 where the area A is a part of the physical block X and FIG. 5 where the area A is the whole physical block X when the data of the area A is included in one NAND physical block X. When the area A is fragmented among plural NAND physical blocks, the following processing (the processing illustrated in FIG. 4 or FIG. 5) is performed on the respective physical blocks.

As illustrated in FIG. 7, the above mentioned management table includes the erasure count management table which stores the data erasure counts for the physical blocks which have the corresponding logical addresses (LBA) in the logical to physical translation table in FIG. 6. Then, the memory system controller 6 reads out the data erasure count of the physical block X specified in Step S102 from the erasure count management table of FIG. 7 stored in the cache memory 3 (Step S103). The memory system controller 6 reads out the erasure counts of the physical blocks having the device-valid data other than the physical block X from the management table (residual physical blocks). The memory controller 6 compares between the erasure count of the physical block X and the erasure counts of the residual physical blocks. When an erasure count of a block in the residual physical blocks is smaller than the block X, the physical block address is added to a physical address list of "group Y" stored in cache memory 3. The group Y is a physical block group, each block of which has a significantly small erasure count than that of the physical block X. So the group Y is a group of "physical blocks of having a small erasure count". For example, a block may be added to the group Y when the erasure count of the block is not more than a predetermined rate of the erasure count of the physical block X (Step S104). The predetermined rate may be set in advance when the chip or the firmware of the memory system controller 6 is designed. When all of the area A does not included in a physical block but the area A exists in plural physical blocks (group P), the group P may be divided into each block and the step S104-S109 may be processed for each block as block X as follows. The memory controller 6 reads out each erasure count of the physical blocks having the device-valid data other than the group P from the management table (residual physical blocks). For each block of group P, the memory controller 6 compares between its erasure count and the erasure counts of the residual physical blocks. When an erasure count of a block in the residual physical blocks is smaller than blocks in group P, the physical block address is added to a physical address list of group Y stored in cache memory 3. For example, a block may be added to the group Y when the erasure count of the block is not more than a predetermined rate of the erasure count of the blocks in physical group P in Step S104. Preferably, a block may be added to the group Y when the erasure count of the block is not more than a predetermined rate of the minimum erasure count among the group P. Hereinafter, the description will be made assuming that the data of the area A is included in one NAND physical block X.

When there is no "physical block of having a small erasure count" (Step S104: No), the memory system controller 6 deallocates the area A by deleting rows of the physical address of the area A from the logical to physical translation table or by changing the whole physical address of the area A to blank, null data or the like in the logical to physical translation table (Step S11A). The memory system controller 6 checks whether the physical block address of block X is included in the logical to physical translation table (FIG. 6) or not; when the physical block address is not included there, the memory system controller 6 adds the physical block address to a free block management table (FIG. 8) further included in the management table (Step S114). It means that a new free block is generated. All of the data in the free block is device-invalid and this free block may be written new data as a writing target when a writing command is newly received from the host 7.

There is a "physical block having a small erasure count" (Step S104: Yes), the processing proceeds to Step S105. In Step S105, the memory system controller 6 checks whether the area A is a part of the physical block X (as in FIG. 4) (Step S105: No) or the whole of the physical block X (as in FIG. 5) (Step S105: Yes).

In FIG. 4 (Step S105: No), an area storing device-valid data excluding the area A in the physical block X is defined as an area C. The area C keeps on storing the device-valid data after the deletion notice processing. An area (area B) formed by the device-valid data included in the block group Y and having the total size with the area C not more than the size of the physical block X (1 block) is selected (Step S106). In other words, the formula of (total size of the area C)+(total size of the area B)≤(size of the physical block X) is satisfied (formula F001). The memory system controller 6 selects areas as the area B in ascending order of erasure count as long as the formula F001 is satisfied, and the memory system controller 6 obtains the physical addresses of the selected area B from the logical to physical translation table (Step S106). The block number of the area B is preferably as small as possible.

The memory system controller 6 reads out all the data in the area C (data c) and the all the data in the area B (data b) onto the cache memory 3 (Step S107). Specifically, it may reads out the whole data of the physical block X once on the cache memory 3 at first and overwrites the data b on the cache data from the area A that is the target of the trim request. The memory system controller 6 may correct the error data by using ECC (error correcting code) in this step. Then, it proceeds to Step S110.

In FIG. 5 (Step S105: Yes), an area (area B) having the device-valid data included in the block group Y and having the total size not more than the size of the physical block X (one block) is selected and the physical address of the area B is obtained (Step S108). The memory system controller 6 reads out the whole data (data b) of the area B onto the cache memory 3 (Step S109). The memory system controller 6 may correct the error data by using ECC in this step. Then, it proceeds to Step S110.

In Step S110, the whole data of the physical block X is erased. Then, when having passed through Steps S106 and S107, the data on the cache memory 3 with the data c and the data b merged is written into the physical block X (returned) (Step S111) (FIG. 4 "Step 2"). When having passed through Steps S108 and S109, the data b on the cache memory 3 is written onto the physical block X (Step S111) (FIG. 5 "Step 2"). The total size of the written data is not necessarily equal to the physical block X in size and the total size may be less than the size of the physical block X; in this case, the remaining area can be used as a free area Z. The data can be added to the free area Z later.

The logical to physical translation table of FIG. 6 is rewritten so that the logical address of the data written into the physical block X is correlated with the physical address of the physical block X (Step S112). When the memory system controller 6 processed Steps S106 and S107, the logical addresses of the data b and the data c are correlated with the physical address of the physical block X. When the memory system controller 6 processed Steps S108 and S109, the logical address of the data b is correlated with the physical address of the physical block X. Then, the erasure count of the physical block X in the erasure count management table illustrated in FIG. 7 is updated to be increased by one (Step S113).

According to the above mentioned operations, the logical address for the data b is not correlated with the physical address of the area B but correlated with the physical address in the physical block X; therefore, the physical address of the area B turns into a unallocated state and it can not be referred from the logical address (FIG. 4 "Step 3" or FIG. 5 "Step 3"). Namely, the whole data of the area B becomes device-invalid. After unallocating the area B, the memory system controller 6 checks whether the physical addresses of the physical blocks including the area B is included in the logical to physical translation table (FIG. 6) or not; when none of the physical addresses of the physical blocks is included there, all the data of the blocks is device-invalid and the memory system controller 6 adds the physical addresses of the physical blocks to a free block management table (FIG. 8) included in the management table (Step S114). When the memory system controller 6 receive a new write command from the host 7, the memory system controller 6 may select this block as a write target. Therefore, this block becomes the target for the static wear leveling in the next writing and the later and the block erasure count distribution of the whole memory system 1 is leveled, thereby improving the reliability of the memory system 1.

For example, when "recycle bin" in the Windows (registered trademark) is emptied to delete a file, the OS send a data deletion notice to the memory system 1. In such case, access to the memory system 1 from the host 7 is not busy most of the time. This embodiment move the load of the memory system 1 to copy data from an access busy time to an access idle time. and thereby disperse the load on the memory system 1 and disturbing the degradation in the performance of the memory system 1. When a deletion notice is received under the situation of busy access to the memory system 1 from host 7, it is not necessary to carry out the data copy operation of the data of the area B into the physical block X. For example, the system may be designed to perform the above-mentioned operation only when a timing of receiving the deletion notice from the host 7 is beyond a predetermined time from the last access by the host 7 to the memory system 1.

Second Embodiment

Figures 8, 9:
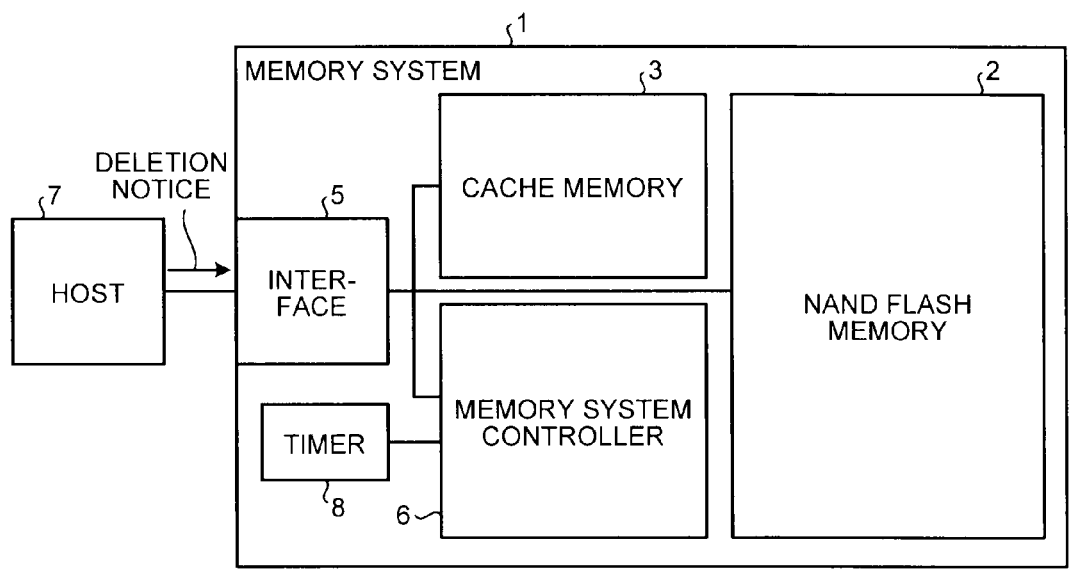
FIG. 8 is a view illustrating a free block management table according to the embodiment.
FIG. 9 is a block diagram illustrating the structure of a memory system according to a second embodiment.

FIG. 9 is a block diagram illustrating a structure of a memory system 1 according to a second embodiment. It has the same structure as that of FIG. 1 except that it is additionally provided with a timer 8 having a clocking function. In FIG. 9, the timer 8 is connected to the memory system controller 6; however, it is not restricted to this structure but the timer 8 may be outside of the memory system 1. The timer 8 may be included inside the memory system controller 6.

This embodiment describes a method to level the elapsed time from the last time when the device-valid data is written in the respective areas of the memory system 1, by processing a data deletion notice (trim request) received from the host V. Of the memory system 1, especially in the memory system 1(SSD) using a NAND flash memory 2, the data stored in the NAND flash memory 2 is easier to lose (data retention failure) according as the elapsed time gets longer from the last time when the data is written (writing elapsed time). The data retention failure is remarkable especially in the block having a large number of erasure count. Accordingly, the extremely old data should be copied into another area, to level the writing elapsed time distribution of the respective data, which is effective in improving reliability in data retention of the memory system 1.

Figure 10:
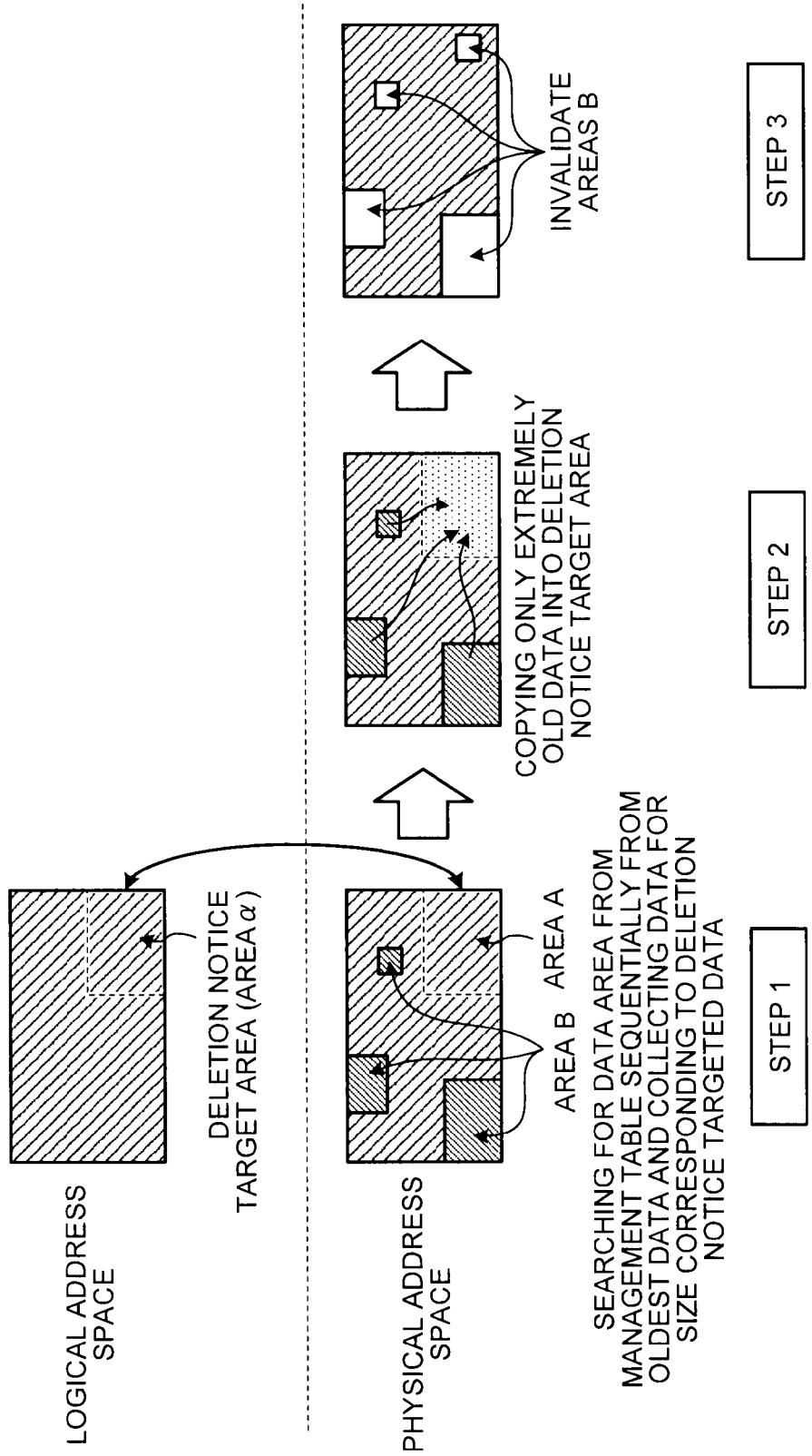
FIG. 10 is a view describing the outline of the concept of the control method of the memory system according to the second embodiment with the logical address space and the corresponding physical address space divided separately.

FIG. 10 is a view describing the outline of the concept of a control method of the memory system according to the embodiment, with a logical address space and the corresponding physical address space divided separately. Upon receipt of a deletion notice for the deletion notice target area (area α) on the logical address space from the host 7, the memory system controller 6 reads out the management table (including a logical to physical translation table and a writing time management table) on the cash memory 3 and obtains the writing elapsed time distribution of the device-valid data in an area on the NAND flash memory 2 expect for the physical block including the physical area A indicated by the physical address corresponding to the area α. The logical to physical translation table is a table as illustrated in FIG. 6. The writing time management table keeps the last writing time when data is written last time to physical addresses having the corresponding logical address in the logical to physical translation table. The writing time management table may be a table for keeping the last writing time when the data is last time written in every physical address on the NAND flash memory 2, regardless of the presence/absence of the corresponding logical address in the logical to physical translation table.

When there is an area B having the data which is written in another area than the physical block including the area A and has an extremely long elapsed time from the final writing time, for example, the data having a predetermined elapsed time and more from the final writing time at a deletion notice time, and when the total data size of the areas B is less than that of the area A, the memory system controller 6 obtains the physical address of the area B and reads out the device-valid data of the area B into the cash memory 3 (FIG. 10, Step 1). The above-predetermined time may be determined in advance at system design time. When the data size of the areas B is larger than that of the area A, areas are selected as the areas B in descending order of elapsed time as long as the total device-valid data size of the areas B is smaller than that of the area A and defines them as the areas B. As illustrated in the figure, the areas B may be fragmented over the NAND flash memory 2. The memory system controller 6 writes the device-valid data read out from the areas B into the area A (FIG. 10 "Step 2"). When the area A have an unwritten area that is not filled by the copy of the data of the areas B, the memory system controller 6 rewrites the management table to set the unwritten area as an additionally writable free area. The memory system 1 invalidates the areas B as a device-invalid area (FIG. 10 "Step 3").

According to the above operations, the writing elapsed time of the above data is reset at zero by copying the data having the extremely long writing elapsed time on the area B into the area A that is the deletion notice target area. Every time of receiving a deletion notice from the host 7, the older data is updated sequentially and the data retention is improved, hence to improve the reliability of the data in the memory system 1.

The control method of the memory system 1 according to this embodiment will be described in detail as follows, using the flow chart illustrated in FIG. 11 and the concept views illustrated in FIGS. 4 and 5. FIGS. 4 and 5 are specifically illustrating the concept of the control method of the memory system according to the first embodiment, with the logical address space and the corresponding physical address space divided separately, and the same figures are also used to describe this embodiment. According to the control method of the memory system in this embodiment, upon receipt of a deletion notice from the host 7, it is possible to level the elapsed time from the last time when the device-valid data is written in the respective areas of the memory system 1.

Of the memory system, especially in the memory system 1 (SSD) using a NAND flash memory 2, the data stored in the NAND flash memory is easier to lose (data retention failure) according as the elapsed time gets longer from the last time when the data is written (elapsed time after writing). The data retention failure is remarkable especially in the area having an extremely larger erasure count. Accordingly, the extremely old data should be copied into another area, to level the elapsed time distribution after writing of the respective data, which is effective in improving reliability in data retention of the memory system 1.

Upon receipt of a deletion notice for the logical address area α that is the deletion notice target from the host 7, (Step S201: Yes), the memory system controller 6 reads out the management table. For example, the management table is stored on the cash memory 3 of FIG. 9. The management table includes a logical to physical translation table, as illustrated in FIG. 6, indicating a correspondence between the logical addresses and the physical addresses for specifying the position of the data on the NAND flash memory 2. The memory system controller 6 specifies the area A on the NAND flash memory 2 of the physical address corresponding to the logical address area α, and the memory system controller 6 specifies a NAND physical block group (group P) including the data of the area A, using the logical to physical translation table in FIG. 6 (Step S202) (FIG. 4 "Step 1", or FIG. 5 "Step 1"). The physical block group specified in Step S202 generally includes one or a plurality of physical blocks. To make the description simple, the description will be hereinafter made assuming that the data of the area A is included in one NAND physical block (block X), as illustrated in "Step 1" of FIGS. 4 and 5.

The processing described later is different between in FIG. 4 where the area A is a part of the physical block X and in FIG. 5 where the area A is the whole physical block X. When the area A is fragmented among plural NAND physical blocks, the following processing will be performed on the respective physical blocks (the processing illustrated in FIG. 4 or FIG. 5).

The above mentioned management table includes a writing time management table, as illustrated in FIG. 12, storing the physical block final writing time when data is written last time in a physical block, for every physical block addresses having the corresponding logical addresses in the logical to physical translation table of FIG. 6. The memory system controller 6 obtains the time of receiving the deletion notice (deletion notice time), reads out the final writing time from the writing time management table of FIG. 12 managed on the cash memory 3, and obtains the elapsed time distribution after the device-valid data is finally written on the physical blocks other than the physical block X (residual physical blocks) by subtracting the deletion notice time from the final writing time (Step S203). As the writing time management table, The final writing time may be stored for each finer physical units (e.g. physical pages) rather than for the unit of the physical block as illustrated in FIG. 12.

The physical addresses and the final writing times of each physical addresses may be written together in the logical to physical translation table as illustrated in FIG. 13. In this case, FIG. 13 is the table serving both as the logical to physical translation table and the writing time management table, and in Step S203, the system controller 6 obtains the elapsed time distribution after writing of the device-valid data in the residual physical blocks by obtaining the time of receiving the deletion notice and the final writing time of the table.

Next, in Step S204, the memory system controller 6 checks whether there is such an area on the NAND flash memory 2, that stores the device-valid data having an extremely long elapsed time in the elapsed time distribution obtained in Step S203, more specifically, having a predetermined elapsed time and more which was set in advance when the chip or the firmware of the memory system controller 6 is designed. When there is no such area (Step S204: No), the memory system controller 6 deallocates the area A by deleting rows of the physical address of the area A from the logical to physical translation table or by changing the whole physical address of the area A to blank, null data or the like in the logical to physical translation table (Step S21A). The memory system controller 6 checks whether the physical block address of block X is included in the logical to physical translation table (FIG. 6) or not; when none of the physical address is included there, the memory system controller 6 adds the physical block address to a free block management table (FIG. 8) further included in the management table (Step S214). It means that a new free block is generated. All of the data in the free block is device-invalid and this free block may be written new data as a writing target when a writing command is newly received from the host 7.

When there is such area (Step S204: Yes), the processing proceeds to Step S205. If the writing time management table in FIG. 12 is used, the case where there exists the area (Step S204: Yes) means the case where the deletion notice time passes over the predetermined time from the final writing time in the residual physical blocks. If the writing time management table in FIG. 13 is used, the case where there exists the area (Step S204: Yes) means the case where the deletion notice time passes over the predetermined time from the final writing time of the physical addresses of the areas other than the physical block X (residual physical areas).

In Step S205, the memory system controller 6 checks whether the area A is a part of the physical block X (the case of FIG. 4) (Step S205: No) or the whole of the physical block X (the case of FIG. 5) (Step S205: Yes).

In FIG. 4 (Step S205: No), an area storing device-valid data excluding the area A in the physical block X is defined as an area C The area C keeps on storing the device-valid data after the deletion notice processing. The area (area B) having the device-valid data included in the area (group Y) judged in Step S204 (the physical block different from the physical block X, or the area (group Y) indicated by the specified physical address) and at the same time, having the total size with the area C not more than the size of the physical block X (one block) is selected (Step S206). In other words, the formula of (total size of the area C)+(total size of the area B)≤(size of the physical block X) is satisfied (formula F001). The memory system controller 6 selects areas as the area B in descending order of elapsed time after writing as long as the formula F001 is satisfied, and the memory system controller 6 obtains the physical addresses of the selected area B from the logical to physical translation table (Step S206). The block number of the area B is preferably as small as possible.

The criteria for the elapsed time in Steps S204 and S206 may adopt the elapsed time after writing which is derived from a failure rate F (e.g. annual failure rate (AFR)), with which the data retention failure can be easily corrected by an ECC correction circuit, using the actual data or simulation result concerned about a relation between the elapsed time after writing and the failure rate.

The memory system controller 6 reads out the whole data of the area C (data c) and the whole data of the area B (data b) onto the cash memory 3 (Step S207). Specifically, it reads out the whole data of the physical block X once onto the cash memory 3 and overwrites the data b on the cache data from the area A that is the target of the trim request. The memory system controller 6 may correct the error data by using ECC (error correcting code) in this step. Then, it proceeds to Step S210.

In FIG. 5 (Step S205: Yes), an area (area B) having the device-valid data included in the area judged in Step S204 (the physical block different from the physical block X, or the area indicated by the specified physical address) and at the same time, having its total size not more than the size of the physical block X (one block) is selected and the physical address of the area B is obtained (Step S208). The memory system controller 6 reads out the whole data (data b) of the area B onto the cash memory 3 (Step S209). Then, it proceeds to Step S210.

In Step S210, the whole data of the physical block X is erased. Then, when having passed through Steps S206 and S207, the data on the cash memory 3 with the data c and the data b merged is written into the physical block X (Step S211) (FIG. 4 "Step 2"). When having passed through Steps S208 and S209, the data b on the cash memory 3 is written onto the physical block X (Step S211) (FIG. 5 "Step 2"). The total size of the written data is not necessarily equal to the size of the physical block X but it may be less than the size of the physical block X; in this case, the remaining area can be treated as a blank area Z. The data can be added to the blank area Z later.

The logical to physical translation table in FIG. 6 or FIG. 13 is rewritten so that the logical address of the data written into the physical block X is correlated with the physical address of the physical block X (Step S212). When the memory system controller 6 processed Steps S206 and S207, the logical address of the data b and the data c is correlated with the physical address of the physical block X. When the memory system controller 6 processed Steps S208 and S209, the logical address of the data b is correlated with the physical address of the physical block X. Then, the final writing time corresponding to the physical block or the physical address of the data written in the physical block X in Step S211 is updated in the writing time management table in FIG. 12 or 13 (Step S213).

According to the above operations, the logical address for the data b is not correlated with the physical address of the area B but correlated with the physical address within the physical block X; therefore, the physical address of the area B turns into a unallocated state and it cannot be referred from the logical address (FIG. 4 "Step 3" or FIG. 5 "Step 3"). Namely, the whole data of the area B becomes device-invalid. After unallocating the area B, the memory system controller 6 checks whether the physical address of the physical block including the area B is included in the logical to physical translation table (FIG. 6) or not; when none of the physical address of the above physical block is included there, all the data of the blocks is device-invalid and the memory system controller 6 adds the physical addresses of the physical blocks to a free block management table (Step S214) (FIG. 8) included in the management table. When the memory system controller 6 receive a new write command from the host 7, the memory system controller 6 may select this block as a write target.

According to the above operations, by copying the data having the extremely long elapsed time after writing into the deletion notice target area, the elapsed time after writing of the data is reset at zero. Every time the memory system controller 6 receives a deletion notice from the host 7, the older data is first updated and the data retention is improved, thereby improving the reliability of the data of the memory system 1.

For example, when "recycle bin" in the Windows (registered trademark) is emptied to delete a file, the OS send a data deletion notice to the memory system 1. In such case, access to the memory system 1 from the host 7 is not busy most of the time. This embodiment moves the load of the memory system 1 to refresh data from an access busy time to an access idle time. When a deletion notice is received under the situation of busy access to the memory system 1, the data copying operation of the data of the area B into the physical block X is not necessarily performed. For example, only when a timing of receiving the deletion notice from the host 7 is beyond a predetermined time from the last access by the host 7 to the memory system 1, the above-described operation may be performed.

Third Embodiment

Figure 14:
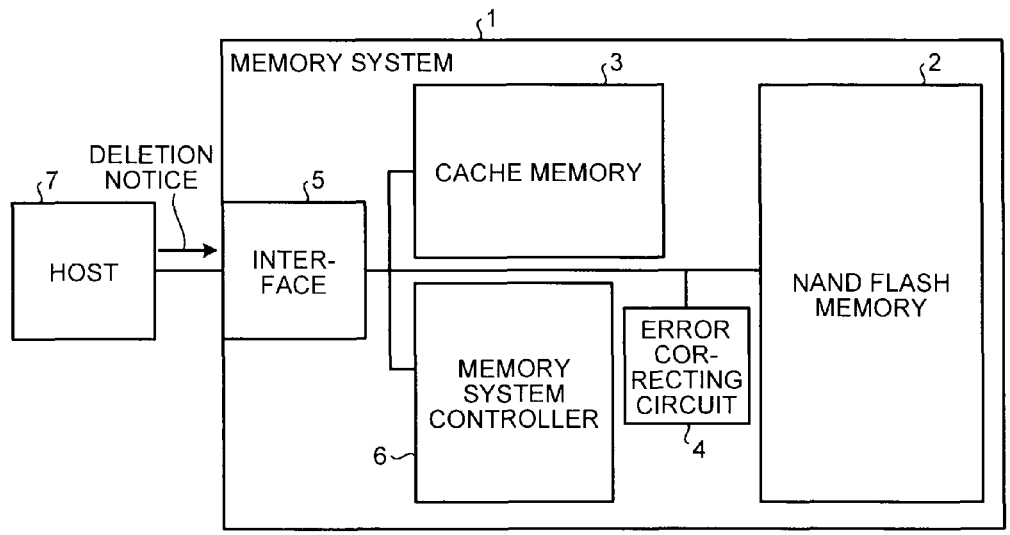
FIG. 14 is a block diagram illustrating the structure of a memory system according to a third embodiment.
Figure 15:
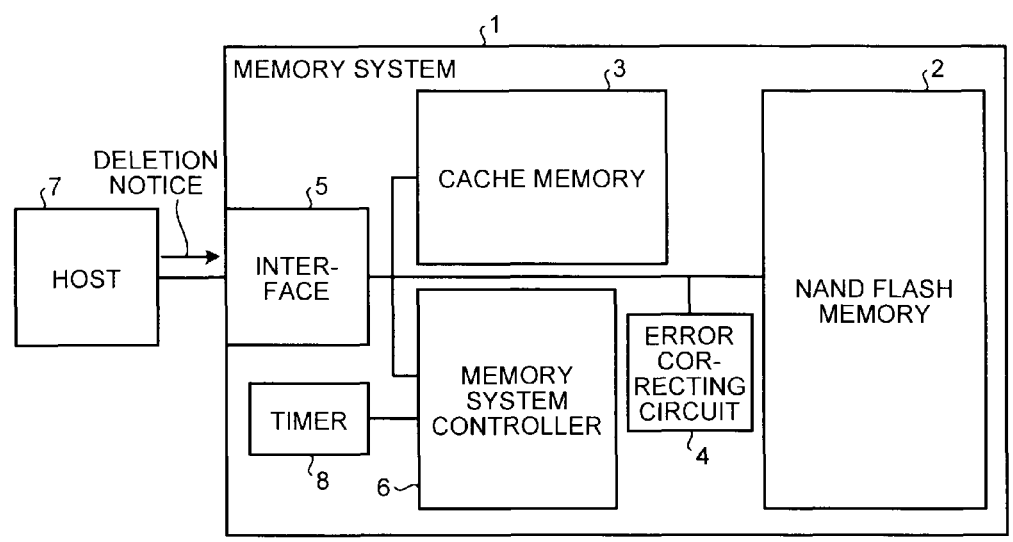
FIG. 15 is a block diagram illustrating another structure of the memory system according to the third embodiment.

FIGS. 14 and 15 are block diagrams illustrating a structure of a memory system 1, according to a third embodiment. FIG. 14 illustrates an error correcting circuit 4 for performing data encoding processing and decoding processing of the recoded data, using an error correcting code (ECC: Error Correcting Code), in addition to the block diagram of FIG. 1 illustrating the structure of the memory system 1 in the first embodiment. FIG. 15 illustrates the error correcting circuit 4, in addition to the block diagram of FIG. 9 illustrating the structure of the memory system 1 in the second embodiment. The outline of the concept of a control method of the memory system according to the embodiment is described with the logical address space and the corresponding physical address space divided separately in FIG. 16.

According to this embodiment, the data to be copied at a time of deletion notice in the first and second embodiments is corrected by using the error correcting circuit 4. The method of selecting the area B that is the copy source is the same as the method having been described in the first and second embodiments except for the procedure of the processing using the error correcting circuit 4 described later.

In reading out the data onto the cash memory 3 (Steps S107 and S109 in FIG. 3, Steps S207 and S209 in FIG. 11) after selecting the areas B (Steps S106 and S108 in FIG. 3, Steps S206 and S208 in FIG. 11), the corresponding data is once read out from the NAND flash memory 2 onto the error correcting circuit 4, then, the error is corrected on the data through the decoding processing (FIG. 16 "Step 1"), and the data is read out onto the cash memory 3. In order to execute an error correction, user data has to contain some redundancy (e.g. Hamming code) for encoding in advance. In writing the data from the cash memory 3 (Step S111 in FIG. 3, S211 in FIG. 11), the data of the cash memory 3 encoded again by the error correcting circuit 4 is written in the area A on the NAND flash memory 2 corresponding to the deletion notice target logical address area (area α) (FIG. 16 "Step 2"). When the area A have an unwritten area that is not filled by the copy of the data of the areas B, the memory system controller 6 rewrites the management table to set the unwritten area as an additionally writable free area. The memory system 1 invalidates the whole data of the areas B that is the copy source as a device-invalid area (FIG. 16 "Step 3").

In the above-mentioned first to third embodiments, as illustrated in FIG. 2, FIG. 4, FIG. 5, FIGS. 10 and 16, the description has been made supposing that the host-valid data does not exist in the logical address area of the deletion notice target but that the device-valid data exists on the corresponding physical address of the memory system 1. However, there is a possibility that the logical address (LBA) which is not correlated to a physical block in the logical to physical translation table may be a deletion notice target area. For example, while a trim request is performed on the area having no data for the host 7, a trim request may be performed on the logical address where the host 7 has never written data, or on the logical address already deallocated. In this case, within the memory system 1, there exists no physical address (physical block) corresponding to the above logical address (LBA). This logical address (LBA) is described in the logical to physical translation table in some cases but not described in the other cases. When it is described in the logical to physical translation table, the column of the corresponding physical address is, for example, blank, null or the like, and there is no correspondence with the physical address. When this data deletion notice is performed from the host 7 to the memory system 1, the memory system 1 promptly notifies the host 7 of the processing completion or replies an error message and the like. In this case, the memory system 1 performs nothing on the data deletion notice.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a first storing area having a plurality of physical blocks including a first block and a second block;
first information indicating a correspondence between logical addresses specified by a host apparatus and physical addresses on the first storing area; and
a controller configured to
receive a deletion request sent from the host apparatus, the deletion request having a first logical address,
read out valid data in the first block,
write the valid data into the second block including a first area, specified by a first physical address corresponding to the first logical address in the first information, and
invalidate the valid data in the first block.

2. The memory system according to claim 1, wherein a first count which is an erasure count of the first block is smaller than a second count which is an erasure count of the second block.

3. The memory system according to claim 2, wherein, when there are at least two blocks having an erasure count smaller than the second count, the controller selects a block having the smallest erasure count among the at least two blocks as the first block.

4. The memory system according to claim 1, wherein a first time exceeds a second time by a third time, the first time being a time when the deletion request is received, the second time being a last time when data is written into the first block.

5. The memory system according to claim 1, wherein the controller, when a first time exceeds a second time by a third time, reads out first data of a second physical address in the first block, writes the first data into the second block, and invalidates the first data of the second physical address, the first time being a time when the deletion request is received, and the second time indicating a last time when data is written in the second physical address.

6. The memory system according to claim 5, further comprising a second storing area capable of recording the first information and second information, the second information having information indicating a last time when data is written in each physical address corresponding to each logical address included in the first information.

7. The memory system according to claim 6, wherein the second storing area is a cache area in DRAM (Dynamic Random Access Memory), SRAM (Static Random Access Memory), or the first storing area.

8. The memory system according to claim 1, further comprising an error correcting unit, wherein writing the valid data into the second block means writing an error-corrected data into the second block, the error-corrected data performed by the error correcting unit on the valid data.

9. The memory system according to claim 1, further comprising a second storing area capable of storing the first information, the second storing area being an area in DRAM (Dynamic Random Access Memory), SRAM (Static Random Access Memory), or the first storing area.

10. A control method of a memory system that includes a first storing area, the first storing area having a plurality of physical blocks including a first block and a second block, the control method of the memory system comprising:
    managing first information indicating a correspondence between logical addresses specified by a host apparatus and physical addresses on the first storing area;
    receiving a deletion request sent from the host apparatus, the deletion request having a first logical address;
    reading out valid data in the first block;
    writing the valid data into the second block including a first area specified by a first physical address corresponding to the first logical address in the first information; and
    invalidating the valid data in the first block.

11. The control method of the memory system according to claim 10, wherein a first count which is an erasure count of the first block is smaller than a second count which is an erasure count of the second block.

12. The control method of the memory system according to claim 11, further comprising:
    selecting, when there are at least two blocks having an erasure count smaller than the second count, a block having the smallest erasure count among the at least two blocks as the first block.

13. The control method of the memory system according to claim 10, wherein a first time exceeds a second time by a third time, the first time being a time when the deletion request is received, the second time being a last time when data is written into the first block.

14. The control method of the memory system according to claim 10, further comprising, when a first time exceeds a second time by a third time:
    reading out first data of a second physical address in the first block;
    writing the first data into the second block; and
    invalidating the first data of the second physical address, the first time being a time when the deletion request is received, the second time being a last time when data is written in the second physical address.

15. The control method of the memory system according to claim 14, wherein the memory system further comprises a second storing area capable of recording the first information and a second information, the second information having information indicating a last time when data is written in each physical address corresponding to each logical address included in the first information.

16. The control method of the memory system according to claim 15, wherein the second storing area is a cache area in DRAM (Dynamic Random Access Memory), SRAM (Static Random Access Memory), or the first storing area.

17. A memory system comprising:
    a storage configured to include a first area and a second area;
    first information indicating a correspondence between logical addresses specified by a host apparatus and physical addresses on the first storing area; and
    a controller configured to, in case of receiving a deletion request from a host apparatus, the deletion request having a first logical address, move first data stored in the first area to the second area, the second area including a third area specified by a first physical address corresponding to the first logical address in the first information.

18. The memory system according to claim 17, wherein an erasure count of the first area is smaller than an erasure count of the second area.

19. The memory system according to claim 18, further comprising second information having information indicating an erasure count in each area corresponding to each logical address included in the first information.

20. The memory system according to claim 17, wherein a first time exceeds a second time by a third time, the first time being a time when the deletion request is received, the second time being a last time when data is written into the first area.

* * * * *